United States Patent [19]

Hines, Jr. et al.

[11] 4,348,236

[45] Sep. 7, 1982

[54] COMPOSITION FOR CASTABLE REFRACTORY BLOCK

[75] Inventors: James E. Hines, Jr., Monroeville, Pa.; Richard G. LaBar, deceased, late of Murrysville, Pa., by Judith LePage LaBar, executor

[73] Assignee: Aluminum Company of America, Pittsburgh, Pa.

[21] Appl. No.: 185,480

[22] Filed: Sep. 9, 1980

[51] Int. Cl.$^3$ ................................................ B28B 7/36
[52] U.S. Cl. ................................... 106/38.27; 501/124
[58] Field of Search .................... 106/38.27, 38.3, 54, 106/64, 38.23; 501/124

[56] References Cited

U.S. PATENT DOCUMENTS

| | | | |
|---|---|---|---|
| 2,516,892 | 8/1950 | Lobaugh | 106/64 |
| 3,269,849 | 8/1966 | Caprio et al. | 106/64 |
| 3,764,354 | 10/1973 | Ritz et al. | 106/54 |
| 4,088,502 | 5/1978 | LaBar | 106/64 |
| 4,158,568 | 6/1979 | LaBar | 106/64 |
| 4,246,035 | 1/1981 | Maczura et al. | 106/64 |

*Primary Examiner*—Theodore Morris
*Attorney, Agent, or Firm*—Max L. Williamson; David J. Hill

[57] ABSTRACT

A particulate refractory mixture is disclosed which is suitable for combination with water to form a castable refractory having high strength, low porosity and enhanced resistance to molten aluminum. The mixture consists essentially of 79.5–89.5% by weight alumina, 10–20% by weight calcium aluminate and 0.5–1.5% by weight borosilicate frit.

24 Claims, No Drawings

COMPOSITION FOR CASTABLE REFRACTORY BLOCK

BACKGROUND OF THE INVENTION

The present invention relates to refractory compositions. More particularly, this invention relates to a particulate refractory composition which is suitable for casting into large blocks that are resistant to the corrosive attack of molten metal.

In the processing of metal such as aluminum and aluminum alloys for casting or purification, ingots of the metal are generally melted in a furnace which is lined with refractory material. This material must not react with the molten metal, but must contain it without dissipating its heat. Thus, the refractory material must exhibit low thermal conductivity and resistance to metal attack (by chemical reaction or by wetting). The material should also exhibit dimensional stability, ease of machinability, spall resistance and resistance to thermal and mechanical shock.

The particular furnace application will dictate the properties and characteristics that are desired in the furnace lining. Such properties and characteristics depend on the type of lining construction utilized and on the particular refractory composition employed in the lining.

Conventional aluminum melting and holding furnaces are typically lined with refractory bricks joined together with mortar. These mortared brick constructions provide high strength, but are subject to failure caused by thermal shock. In addition, it is difficult to line non-planar surfaces with a brick and mortar construction; hence furnace design flexibility is reduced. Finally, mortared brick constructions are expensive to install and maintain, and the many mortared joints of such constructions provide sites for thermal stress cracks and consequent metal penetration and lining failure.

In order to eliminate some of the disadvantages of mortared brick linings, monolithic linings have been proposed as alternatives. Such linings are applied to the furnace walls by ramming or tamping, and then are fired in place by heating of the furnace. These linings provide the advantage of no-joint construction and enhanced furnace design flexibility. However, since temperature conditions are rarely uniform throughout the furnace, fired properties may not be uniform throughout the lining. This may result in areas of the lining having reduced strength and in cracking in the lining because of uneven thermal expansion and shrinkage. The presence of cracks in the lining invites metal penetration therethrough and consequent lining failure.

It has been suggested that the principal disadvantages of both mortared brick and monolithic constructions may be avoided while the principal advantages of each may be retained in a large block construction. Large blocks should be large enough to eliminate the need for many mortared joints, yet small enough to be formed and fired outside of the melting furnace. Generally, the practical size of such blocks has been limited by the weight that can be handled with relative ease. Such blocks have therefore been constructed with weights near 2,000 kg.

It has already been explained that the properties and characteristics desired in a furnace lining depend not only on the type of lining construction utilized, but also on the refractory composition employed in the lining. If a brick and mortar construction is desired, a variety of refractory brick and mortar compositions is commercially available. Similarly, for monolithic or large block constructions, a variety of refractory compositions has been employed. Generally, however, the refractory compositions which have been employed in monolithic or large block constructions in metal melting furnaces have been either phosphate bond-forming plastic materials or refractory concretes.

The phosphate bond-forming plastic refractories are generally comprised of a blend of ground refractory materials and phosphoric acid. The blend is supplied in plastic form, suitable for ramming or tamping into the desired shape. The refractory concretes, on the other hand, are generally comprised of a blend of ground refractory materials and a bonding or cementing agent such as calcium aluminate. The blend is mixed with water and generally poured into a mold for casting. The principal difference, however, between phosphate bond-forming plastic refractories and refractory concretes is in their bonding mechanisms.

Phosphate bond-forming plastic refractories are characterized by the formation of phosphate bonds between constituents of the refractory aggregate. For a plastic refractory containing alumina, the initial bonding reaction:

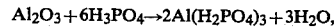

proceeds upon exposure of the blend to air or upon the application of heat.

When the blend is subsequently heated to 320°-400° C., the intermediate compound, $Al(H_2PO_4)_3$, reacts with additional alumina to form $AlPO_4$ by the following reaction:

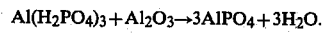

A phosphate bond-forming plastic refractory blend which has been produced by A. P. Green Refractory Company includes a refractory aggregate comprised of about 86.7% by weight $Al_2O_3$, 9.8% by weight $SiO_2$, 2.2% by weight $TiO_2$, 1.2% by weight $Fe_2O_3$ and traces of CaO, $Na_2O$ and $K_2O$. To this aggregate is added sufficient phosphoric acid to provide a $P_2O_5$ addition of about 4.8% by weight.

Refractory concretes are characterized by the formation of hydraulic cement bonds between the constituents of the refractory aggregate upon mixture of the blend with water. These concretes are further characterized by the dissolution of these hydraulic bonds upon heating and the subsequent formation of ceramic bonds between the constituents of the aggregate as heating continues. In refractory concrete blends containing alumina and calcium aluminate, the initial bonding derives primarily from the hydration of $CaO.Al_2O_3$ to $CaO.Al_2O_3.10H_2O$ and $2CaO.Al_2O_3.8H_2O$. These metastable crystalline hydrates spontaneously change to the more stable $3CaO.Al_2O_3.6H_2O$, envolving physically absorbed water and $Al_2O_3.3H_2O$ as the change occurs. Upon heating to elevated temperatures (200°-350° C.), however, these hydrates begin to lose appreciable portions of their combined water. As combined water is lost, the strength of the hydraulic bonds between the constituents of the aggregate is reduced, and the predominance of $CaO.Al_2O_3$ and $CaO.2Al_2O_3$ increases. As heating continues above about 1100° C., the concrete develops an appreciable ceramic strength by reason of the melting of some of the low melting point compounds in the cement which combine with the aggregate to form a ceramic bond. Ceramic bond strength increases upon firing to 1400°-1650° C. with the appearance of appreciable quantities of $CaO.6Al_2O_3$.

A refractory concrete composition of the type described above is disclosed in U.S. Pat. No. 2,516,892 of Lobaugh. This composition contains 15-93.5% by weight refractory aggregate such as fireclay grog, crushed firebrick, expanded shale, diatomaceous earth, vermiculite, crushed red brick, and the like, 5-60% by weight calcium aluminate and 0.5-25% by weight of a substantially insoluble silicate frit which has a melting point of 1600° F. or less. The frits which may be used in this composition are smelted mixtures of soluble and insoluble inorganic materials which are prepared by melting the soluble materials in the presence of sufficient silica and at a temperature high enough to form substantially insoluble silicates.

Another refractory composition is disclosed in U.S. Pat. No. 3,269,849 of Caprio et al. This composition contains 20-30% by weight of a fibrous material such as fibrous alumina-silica or fibrous potassium titanate, 40-60% by weight asbestos fiber, 20-25% by weight calcium aluminate and 2.5-5% by weight cryolite ($Na_3AlF_6$).

U.S. Pat. No. 4,158,568 of LaBar also describes a refractory concrete composition of the type described generally herein. This composition contains 60-88 parts by weight alumina, 10-34 parts by weight calcium aluminate and 1.5-10 parts by weight of a zinc borosilicate frit which consists essentially of 50-60% by weight zinc oxide, 20-40% by weight boron oxide, 8-12% by weight silicon dioxide and 0-10% by weight aluminum oxide.

Although the known refractory compositions may be satisfactorily employed in many furnace lining applications, few are suitable for use in an aluminum/aluminum alloy melting furnace. For example, the phosphate bond-forming materials are generally considered to be somewhat unsuitable for such use because of the tendency of molten aluminum to react with $AlPO_4$. Similarly, the refractory concretes which contain silicon dioxide in their aggregates are considered to be generally unsuitable for use in the linings of aluminum-/aluminum alloy melting furnaces because of the tendency of aluminum to reduce the silicon dioxide.

Previous efforts aimed at developing a suitable refractory concrete composition for use in an aluminum-/aluminum alloy melting furnace have combined large amounts of calcium aluminate and boron oxide and zince oxide additives in order to provide ceramic bond strength and resistance to the corrosive attack of aluminum. However, the refractory blocks produced from such compositions are subject to load deformation at temperatures within the operating range of aluminum-/aluminum alloy melting furnaces (up to 900° C.). Such blocks may crack under the weight of higher blocks at such temperatures, allowing metal penetration through the lining and consequent lining failure. These blocks are also subject to explosive spalling because of their low surface porosity and the consequent inability of absorbed water to be safely released upon heating.

SUMMARY OF THE INVENTION

It is an object of the present invention to provide a refractory composition which is suitable for use in an aluminum/aluminum alloy melting furnace. It is a further object of this invention to provide a refractory composition for such use which does not require large amounts of calcium aluminate or metal oxide additives. It is another object of the invention to provide such a composition which is suitable for mixture with water to form a castable refractory having high strength, low porosity and enhanced resistance to molten aluminum. It is yet another object of the invention to provide such a composition which may be formed into large blocks which are suitable for use in aluminum/aluminum alloy melting furnaces.

In accordance with these and other objects, the present invention provides a particulate refractory composition consisting essentially of 79.5-89.5% by weight alumina, 10-20% by weight calcium aluminate and 0.5-1.5% by weight borosilicate frit. In a preferred embodiment, the composition includes a borosilicate frit which contains 5-25% by weight fluorine and which has a melting point between 620° C. and 760° C.

DETAILED DESCRIPTION OF THE INVENTION

The present invention provides a refractory composition which consists essentially of a particulate mixture of alumina, calcium aluminate and borosilicate frit. Preferably, the particle sizes of the constituents of the composition are controlled so as to allow a consistent intimate distribution of the constituents in the finished refractory.

The alumina utilized may be tabular alumina, and its particle size is preferably controlled such that 20-40% by weight of the alumina particles are between 1.41 mm and 4.76 mm in size, 15-30% by weight are between 0.297 mm and 1.41 mm in size and 25-40% by weight are less than 0.297 mm in size.

The calcium aluminate which is used in the invention may be obtained from a variety of commercial sources. In a preferred embodiment of the invention, the calcium aluminate comprises a mixture of 75-83% by weight aluminum oxide and 14-23% by weight calcium oxide, with a total of no more than 3% by weight of other oxides, primarily zinc oxide, boron oxide and silicon dioxide. Such a calcium aluminate product is sold by Aluminum Company of America under the designation "CA-25". The particle size of the calcium aluminate is preferably controlled so that at least 90% by weight is less than 0.044 mm.

The borosilicate glass frit used in the invention consists essentially of a fused mixture of boron oxide and silicon oxide. According to a preferred embodiment, the frit contains 15-35% by weight boron oxide, 5-30% by weight silicon dioxide and a total of no more than 20% by weight alkali compounds such as lithium oxide, sodium oxide and potassium oxide. The preferred frit also contains 5-25% by weight fluorine, and its particle size is controlled to less than 0.149 mm.

The refractory composition of this invention consists essentially of 79.5-89.5% by weight alumina, 10-20% by weight calcium aluminate and 0.5-1.5% by weight borosilicate frit. A preferred composition contains 80-85% by weight alumina, 14-18% by weight calcium aluminate and 0.5-1.5% by weight borosilicate frit, wherein the frit contains 10-15% by weight fluorine.

Unexpectedly, it has been found that the composition of this invention may be used to produce a refractory block or monolithic lining with a unique combination of properties. These refractory products exhibit low apparent porosity and deformation under load, and high density, strength and resistance to molten aluminum. The invention thus provides a refractory composition that can be used to produce refractory products which perform well in the linings of aluminum/aluminum alloy melting furnaces.

In order to further illustrate the advantages of the present invention, test blocks were prepared using several refractory concrete compositions. The compositions tested contained 10–25% by weight calcium aluminate, 0.5–9% by weight frit and the balance alumina.

tures. Table I lists the compositions of the frits employed. All were obtained from Pemco Products, a division of SCM Corporation. Frit number 1 is sold under the designation "P-626P"; frit number 2 under the designation "P-1A44"; frit number 3 under the designation "P-1T27"; and frit number 4 under the designation "P-2V25P". Table II lists the compositions of the calcium aluminate products used. Product number 1 is sold by Aluminum Company of America under the designation "CA-25". Product number 2 is sold by Lone Star Lafarge, Inc. under the designation "Fondu".

TABLE I

| Frit | Composition in percent by weight | | | | | | | | | | |
|---|---|---|---|---|---|---|---|---|---|---|---|
|  | $B_2O_3$ | F | $Na_2O$ | MgO | $Al_2O_3$ | $SiO_2$ | $P_2O_5$ | CaO | ZnO | $ZrO_2$ | BaO |
| 1 | 12.4 |  | 5.6 |  | 5.4 | 49.2 |  |  |  |  | 27.4 |
| 2 | 32.5 |  |  |  |  | 8.0 |  | 59.5 |  |  |  |
| 3 | 18.2 | 9.8 | 13.4 |  | 7.4 | 27.4 | 2.4 | 4.8 | 3.4 | 13.1 |  |
| 4 | 21.5 | 12.2 | 15.3 | 3.0 | 0.7 | 25.1 |  | 22.2 |  |  |  |

TABLE II

| Calcium Aluminate Product | Composition in percent by weight | | | | | | | | | |
|---|---|---|---|---|---|---|---|---|---|---|
|  | $Al_2O_3$ | CaO | FeO | $Fe_2O_3$ | $K_2O$ | MgO | $Na_2O$ | $SiO_2$ | $TiO_2$ | Loss on Ignition (1100° C.) |
| 1 | 79.0 | 18.0 |  | 0.3 |  | 0.4 | 0.5 | 0.2 |  | 1.5 |
| 2 | 39.0 | 37.5 | 6.0 | 9.0 | 0.1 | 0.5 | 0.2 | 4.5 | 2.0 | 0.4 |

An amount of six kilograms of each composition was blended and mixed with water at room temperature. The proper amount of water for mixing was determined visually by making a ball-in-hand consistency test. Generally, an amount of water equal to 5–18% by weight of the weight of the dry blend was used. The mixture was then poured into an oil-coated steel mold having a 51 mm×51 mm×229 mm cavity size. The blocks were cured at 21°–32° C. in a plastic enclosure which maintained a relative humidity of 90–100% for 24 hours. The cured blocks were then dried to remove physically absorbed water by maintaining their temperature for eight hours at 35° C., followed by an additional eight hours at 82° C. and a final eight hours at 110° C. The temperature was then increased at a rate within the range of 25°–30° C./hour to the desired firing temperature, which was maintained for about five hours.

Four borosilicate frits and two calcium aluminate products were employed in the various refractory mixtures.

Table III lists the refractory concrete compositions tested, the variables in the preparation of test blocks therefrom, and the results of several tests which were carried out on the test blocks. All testing was carried out according to ASTM procedures except for the hot load and explosive spalling tests. The hot load test measured the deformation of a 51 mm×51 mm×152.4 mm block when heated to 1450° C. at a rate of 100° C./hour under a compressive stress of 25 psi. The deformation recorded is the deformation under load after six hours at 1450° C. The explosive spalling test was performed by abruptly thrusting 6.35 cm cured, but undried, test cubes into an electric furnace maintained at a specific test temperature. If an explosion did not occur within a period of 20 minutes, the test block was considered to have survived the test. Test cubes were subjected to increasingly higher temperatures until an explosion occurred.

TABLE III

| Mix No. | Calcium Aluminate Type | % | Frit Type | % | % Water | Mixing Time, Min. | Firing Temp. °C. | Firing Shrink. % | Bulk Density kg/mm³ | Apparent Porosity % | Mod. of Rupture psi | Corrosion Resistance Rating | Explosive Spalling °C. | Hot Load Deform. Under Load, % |
|---|---|---|---|---|---|---|---|---|---|---|---|---|---|---|
| 1 | 1<br>2 | 20<br>5 | 2 | 3 | 7.3 | 10 | 732 | 0.27 | 2800 | 16.9 | 2478 | Excellent |  |  |
| 2 | 1<br>2 | 20<br>5 | 2 | 6 | 7.3 | 10 | 732 | 0.41 | 2816 | 17.2 | 2722 | Excellent |  |  |
| 3 | 1<br>2 | 20<br>5 | 2 | 9 | 7.3 | 10 | 732 | 0.41 | 2816 | 16.2 | 3259 | Excellent |  |  |
| 4 | 1<br>2 | 20<br>5 | 4 | 2 | 7.3 | 5 | 820 | 0.21 | 2768 | 23.0 | 2122 |  |  |  |
| 5 | 1<br>2 | 20<br>5 | 3 | 2 | 7.3 | 5 | 820 | 0.15 | 2784 | 22.3 | 2001 |  |  |  |
| 6 | 1<br>2 | 20<br>5 | 4 | 4 | 7.3 | 8 | 820 | 0.25 | 2752 | 17.5 | 2387 |  |  |  |
| 7 | 1 | 20 | 3 | 4 | 7.3 | 7 | 820 | 0.22 | 2768 | 21.4 | 2052 |  |  |  |
| 8 | 1<br>2 | 20<br>5 | 4 | 6 | 7.5 | 10 | 820 | 0.35 | 2752 | 18.0 | 2384 |  |  |  |
| 9 | 1<br>2 | 20<br>5 | 3 | 6 | 7.5 | 10 | 820 | 0.32 | 2763 | 21.7 | 1918 |  |  |  |
| 10 | 1 | 25 | 4 | 1.5 | 7.3 | 10 | 820 | 0.15 | 2832 | 17.9 | 2406 | Excellent |  |  |
| 11 | 1 | 25 | 4 | 1 | 7.3 | 10 | 820 | 0.16 | 2816 | 23.7 | 2548 | Very | 578 |  |

TABLE III-continued

| Mix No. | Calcium Aluminate Type | % | Frit Type | % | % Water | Mixing Time, Min. | Firing Temp. °C. | Firing Shrink. % | Bulk Density kg/mm³ | Apparent Porosity % | Mod. of Rupture psi | Corrosion Resistance Rating | Explosive Spalling °C. | Hot Load Deform. Under Load, % |
|---|---|---|---|---|---|---|---|---|---|---|---|---|---|---|
| 12 | 1 | 25 | 4 | 0.5 | 7.3 | 10 | 820 | 0.17 | 2832 | 25.7 | 2638 | Excellent Excellent | 578 | |
| 13 | 1 | 20 | 4 | 1 | 6.25 | 15 | 820 | 0.12 | 2864 | 19.1 | 2837 | Excellent | 593 | |
| 14 | 1 | 15 | 4 | 1 | 5.5 | 15 | 820 | 0.13 | 2896 | 18.1 | 2220 | Excellent | 649 | 3.3 |
| 15 | 1 | 10 | 4 | 1 | 5.6 | 15 | 820 | 0.08 | 2960 | 16.9 | 1965 | Excellent | 649 | |
| 16 | 1 | 5 | 4 | 1 | 5.7 | 15 | 820 | 0.08 | 3008 | 15.8 | 1400 | Excellent | 593 | |
| 17 | 1 | 15 | — | — | 6.0 | 15 | 820 | 0.10 | 2928 | 19.4 | 2663 | Poor | | 0.1 |
| 18 | 1 | 15 | 2 | 1 | 6.1 | 15 | 820 | 0.16 | 2912 | 18.8 | 2166 | Excellent | | |
| 19 | 1 | 15 | 4 | 0.5 | 6.25 | 15 | 820 | 0.14 | 2848 | 19.4 | 1547 | Excellent | | 3.1 |
| 20 | 1 | 10 | 4 | 0.5 | 6.1 | 15 | 820 | | | | | Good to Excellent | | |
| 21 | 1 | 15 | 1 | 1 | 6.1 | 15 | 820 | 0.13 | 2912 | 19.5 | 2748 | Good | | |
| 22 | 1 | 15 | 4 | 0.5 | 6.25 | 15 | 927 | 0.27 | 2864 | 17.8 | 2776 | Excellent | | |

At the conclusion of these tests, several large blocks were cast from refractory compositions which consisted essentially weight calcium aluminate product number 1 and 0.5-1.5% by weight frit number 4. Each of these blocks was formed in the following manner. A dry composition of alumina, calcium aluminate and frit was blended, and the blend was mixed with an amount of water equal to about 5-8% by weight of the weight of the dry blend. The mixture was then cast in the form of a large block, and the block was cured at 21°-32° C. for about eight hours. The cured block was then dried to remove physically absorbed water. Drying was generally carried out at a temperature within the range of 35°-110° C. for about 24 hours, although drying temperatures and times could be substantially altered, so long as the drying was carried out to remove substantially all of the physically absorbed water.

As the dried blocks were gradually heated to firing temperature in much the same manner as the test blocks, violent explosions occurred as the temperature of the blocks exceeded about 320° C. Further investigation revealed that for blocks weighing at least 200 kg, a strong endothermic reaction occurred at a temperature within the range of 235°-320° C. This reaction is believed to be associated with the dehydration of 3CaO·Al$_2$O$_3$·6H$_2$O and Al$_2$O$_3$·3H$_2$O within the cement.

Subsequent experimentation, however, revealed that these violent explosions could be avoided by heating the dried blocks from drying temperature to a hold temperature within the range of 235°-320° C., preferably about 260° C., at a rate no greater than 20° C./hour, and maintaining this hold temperature until the blocks were uniformly heated to that temperature. Then the blocks could be further heated from the hold temperature to a firing temperature of at least 600° C. at a rate no greater than 30° C./hour, and maintained at the firing temperature for at least five hours. Blocks were produced by this method weighing approximately 1,816 kg and measuring 451 mm×682 mm×1,312 mm. These blocks were tested in a full-scale melting furnace, where they provided structural stability and high resistance to metal corrosion, thermal and mechanical shock.

It should be understood that the above description of the present invention is susceptible to various modifications, changes and adaptations, and the same are intended to fall within the meaning and range of equivalents of the appended claims.

What is claimed is:

1. A particulate refractory mixture suitable for combination with water to form a castable refractory having high strength, low porosity and enhanced resistance to molten aluminum, consisting essentially of:
   79.5-89.5% by weight alumina;
   10-20% by weight calcium aluminate; and
   0.5-1.5% by weight borosilicate frit.

2. The mixture of claim 1 wherein the particle size of the alumina is controlled such that:
   20-40% by weight is less than 4.76 mm but greater than 1.41 mm;
   15-30% by weight is less than 1.41 mm but greater than 0.297 mm; and
   25-40% by weight is less than 0.297 mm.

3. The mixture of claim 1 wherein the calcium aluminate by weight of other oxides.

4. The mixture of claim 1 wherein the particle size of the calcium aluminate is controlled so that at least 90% by weight is less than 0.044 mm.

5. The mixture of claim 1 wherein the frit contains 5-25% by weight fluorine.

6. The mixture of claim 5 wherein the frit contains 15-35% by weight boron oxide, 5-30% by weight silicon dioxide and no more than 20% by weight alkali compounds.

7. The mixture of claim 6 wherein the particle size of the frit is controlled to less than 0.149 mm.

8. The mixture of claim 7 wherein the melting point of the frit is between 620° C. and 760° C.

9. A refractory composition suitable for mixture with water for casting into a large block, consisting essentially of:
   80-85% by weight alumina;
   14-18% by weight calcium aluminate; and
   0.5-1.5% by weight of a borosilicate frit,
wherein said frit contains 10-15% by weight fluorine.

10. The composition of claim 9 wherein the alumina particle size is controlled such that:
   20-40% by weight is less than 4.76 mm but greater than 1.41 mm;
   15-30% by weight is less than 1.41 mm but greater than 0.297 mm; and
   25-40% by weight is less than 0.297 mm.

11. The composition of claim 9 wherein the calcium aluminate comprises a mixture of 75-83% by weight aluminum oxide, 14-23% by weight calcium oxide and no more than 3% by weight of other oxides.

12. The composition of claim 9 wherein the particle size of the calcium aluminate is controlled so that at least 90% by weight is less than 0.044 mm.

13. The composition of claim 9 wherein the frit contains 15-35% by weight boron oxide, 5-30% by weight silicon dioxide and no more than 20% by weight alkali compounds.

14. The composition of claim 13 wherein the particle size of the frit is controlled to less than 0.149 mm.

15. The composition of claim 14 wherein the melting point of the frit is between 620° C. and 760° C.

16. A method for making a large block, comprising:
   (a) blending a dry composition consisting essentially of:
      79.5-89.5% by weight alumina,
      10-20% by weight calcium aluminate, and
      0.5-1.5% by weight borosilicate frit;
   (b) mixing the blend with 5-8% by weight water;
   (c) casting the mixture in the form of a large block;
   (d) curing the block at 21°-32° C. for at least 8 hours;
   (e) drying the cured block to remove physically absorbed water;
   (f) heating the dried block, at a rate no greater than 20° C./hour, from drying temperature to a hold temperature within the range of 235°-320° C.;
   (g) maintaining the block at the hold temperature until the block is uniformly heated to that temperature;
   (h) heating the block, at a rate no greater than 30° C./hour, from the hold temperature to a firing temperature of at least 600° C.; and
   (i) maintaining the block at the firing temperature for at least 5 hours.

17. The method of claim 16 wherein the hold temperature is 260° C.

18. The method of claim 16 wherein the cured block is dried at a temperature within the range of 35°-110° C. for at least 24 hours.

19. The method of claim 16 wherein the alumina particle size is controlled such that:
   20-40% by weight is less than 4.76 mm but greater than 1.41 mm;
   15-30% by weight is less than 1.41 mm but greater than 0.297 mm; and
   25-40% by weight is less than 0.297 mm.

20. The method of claim 16 wherein the calcium aluminate comprises a mixture of 75-83% by weight aluminum oxide, 14-23% by weight calcium oxide and no more than 3% by weight of other oxides.

21. The method of claim 16 wherein the particle size of the calcium aluminate is controlled so that at least 90% by weight is less than 0.044 mm.

22. The method of claim 16 wherein the frit contains 15-35% by weight boron oxide, 5-30% by weight silicon dioxide and no more than 20% by weight alkali compounds.

23. The method of claim 16 wherein the particle size of the frit is controlled to less than 0.149 mm.

24. The method of claim 16 wherein the melting point of the frit is between 620° C. and 760° C.

* * * * *

UNITED STATES PATENT AND TRADEMARK OFFICE
CERTIFICATE OF CORRECTION

PATENT NO. : 4,348,236
DATED : September 7, 1982
INVENTOR(S) : James E. Hines, Jr. et al It is certified that error appears in the above–identified patent and that said Letters Patent are hereby corrected as shown below:

| | |
|---|---|
| Col. 5, line 32 | Change "5-18%" to --5-8%-- |
| Col. 5-6 | Table III, for Mix No. 5, under heading "Hot Load Deform. Under Load, %", add --4.9-- |
| Col. 7, line 21 | Delete "essentiallyweight" and insert --essentially of 80-85% by weight alumina, 14-18% by weight-- |
| Claim 3, Col. 8, line 33 | Delete "aluminateby" and insert --aluminate comprises a mixture of 75-83% by weight aluminum oxide, 14-23% by weight calcium oxide and no more than 3% by-- |

Signed and Sealed this

Sixteenth Day of November 1982

[SEAL]

Attest:

GERALD J. MOSSINGHOFF

Attesting Officer           Commissioner of Patents and Trademarks